(12) United States Patent
Kato et al.

(10) Patent No.: US 7,225,675 B2
(45) Date of Patent: Jun. 5, 2007

(54) CAPACITANCE TYPE DYNAMIC QUANTITY SENSOR

(75) Inventors: Kenji Kato, Chiba (JP); Minoru Sudo, Chiba (JP); Mitsuo Yarita, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 10/920,017

(22) Filed: Aug. 17, 2004

(65) Prior Publication Data
US 2005/0066729 A1    Mar. 31, 2005

(30) Foreign Application Priority Data
Aug. 25, 2003    (JP)    ............... 2003-299517

(51) Int. Cl.
*G01P 15/125*    (2006.01)
(52) U.S. Cl. ................. 73/514.32; 73/514.36
(58) Field of Classification Search ............. 73/514.32, 73/514.16, 514.29, 504.04, 504.12, 504.15
See application file for complete search history.

(56) References Cited

U.S. PATENT DOCUMENTS

| | | | | |
|---|---|---|---|---|
| 5,228,341 A | * | 7/1993 | Tsuchitani et al. | ........ 73/514.36 |
| 5,350,189 A | * | 9/1994 | Tsuchitani et al. | .......... 280/735 |
| 5,417,312 A | * | 5/1995 | Tsuchitani et al. | ...... 188/181 A |
| 5,456,111 A | * | 10/1995 | Hulsing, II | ............... 73/514.32 |
| 6,035,714 A | * | 3/2000 | Yazdi et al. | ............. 73/514.32 |
| 6,105,427 A | * | 8/2000 | Stewart et al. | ........... 73/514.32 |

* cited by examiner

*Primary Examiner*—Helen Kwok
(74) *Attorney, Agent, or Firm*—Adams & Wilks

(57) ABSTRACT

A capacitance type dynamic quantity sensor has a first substrate, a second substrate disposed over the first substrate, and first and second electrodes each disposed on a main surface of a respective one of the first and second substrates. Each of the first and second electrodes has through-holes formed in a portion thereof. A third substrate is disposed between and connected to the main surface of each of the first and second substrates. A vibration member is mounted on the third substrate so as to confront the first and second electrodes with gaps therebetween. The vibration member is mounted on the third substrate to undergo vibrational movement in response to application of an acceleration or an angular velocity to the vibration member so that the capacitance type dynamic quantity sensor detects a dynamic quantity in accordance with a change in capacitance between the first and second electrodes due to vibrational movement of the vibration member.

12 Claims, 7 Drawing Sheets

CAPACITANCE TYPE DYNAMIC QUANTITY SENSOR

BACKGROUND OF THE INVENTION

1. Field of the Invention

The present invention relates in general to a sensor for detecting a dynamic physical quantity such as acceleration or angular velocity. In particular, the present invention relates to a capacitance type dynamic quantity sensor for detecting a dynamic physical quantity by detecting a change in capacitance due to displacement of a structure which is manufactured through a semiconductor process.

2. Description of the Related Art

Heretofore, there has been known a capacitance type dynamic quantity sensor in which a weight adapted to be displaced due to applied acceleration or angular velocity from the outside, and beams for supporting the weight are formed within a semiconductor substrate in order to detect a change in capacitance obtained between movable electrodes of the weight and fixed electrodes formed at a minute interval from the movable electrodes (refer to JP 08-094666 A for example) FIG. 7 is a schematic cross sectional view showing a structure of a conventional capacitance type dynamic quantity sensor. In this sensor, a weight 71 and beams 72 are formed within a semiconductor substrate 73 through a fine patterning process, and are joined and sealed from both sides with upper and lower substrates 74 and 75. Such a capacitance type sensor has sensor sensitivity sensitive to minute gaps 76 and 77, and hence the fluctuation in minute gaps exerts a large influence on the sensor sensitivity characteristics. The minute gaps 76 and 77 are determined based on the gaps which are formed by selectively etching away the upper and lower substrates 74 and 75, or the semiconductor substrate 73, and the thicknesses of upper and lower fixed electrodes 78 which are formed on inner surfaces of the upper and lower substrates 74 and 75 facing the semiconductor substrate 73. Consequently, it can be said that the control for the thicknesses of the fixed electrodes is important. For example, the generation of hillocks on the surfaces of the fixed electrodes causes the fluctuation in the minute gaps 76 and 77, and also narrows a movable range of the weight to cause reduction of the sensitivity.

In the manufacturing method of the capacitance type dynamic quantity sensor disclosed in JP 08-094666 A, a glass substrate is used for each of the upper and lower substrates. Then, in order to avoid the generation of the hillocks on the surfaces of the fixed electrodes formed on the respective glass substrates, there is adopted a two-layer electrode structure having an Al layer and a Ti layer as a base layer. However, the adoption of the multilayer electrode structure increases the manufacturing cost. Moreover, the film peeling of the two-layer electrode becomes liable to occur due to a difference between the thermal expansion coefficients of the different kinds of electrode layers, reducing reliability of the sensor. Moreover, since a resistance value of the Ti layer is high, the Al layer needs to be thickened to reduce the resistance value of the total fixed electrode. As a result, the total fixed electrode becomes thick, and hence the fluctuation in the electrode thicknesses becomes liable to occur.

SUMMARY OF THE INVENTION

The present invention has been made in the light of the foregoing, and it is, therefore, an object of the present invention to provide an inexpensive capacitance type dynamic quantity sensor which prevents the generation of hillocks on surfaces of electrodes, and which prevents film peeling of the electrode to thereby increase the reliability of the capacitance type dynamic quantity sensor.

In order to attain the above-mentioned object, according to the present invention, there is provided a capacitance type dynamic quantity sensor for detecting a physical dynamic quantity such as acceleration or angular velocity based on a change in capacitance due to displacement of a structure manufactured through a semiconductor process, the capacitance type dynamic quantity sensor including: a semiconductor substrate having a weight supported by beams and adapted to be displaced due to a dynamic quantity such as acceleration or angular velocity applied from the outside; an upper substrate joined to a part of a surface of the semiconductor substrate, the upper substrate having a first fixed electrode being laminated thereon so as to be disposed with a minute gap in a position facing the weight; and a lower substrate joined to a part of a rear of the semiconductor substrate, the lower substrate having a second fixed electrode being laminated thereon so as to be disposed with a minute gap in a position facing the weight, the capacitance type dynamic quantity sensor serving to measure a dynamic quantity based on a change in capacitance obtained between the first and second fixed electrodes due to displacement of the weight, in which a plurality of grooves or a plurality of holes is formed in a part of the first fixed electrode or in a part of the second fixed electrode.

In addition, according to one aspect of the present invention, the plurality of grooves or the plurality of holes are disposed at equal intervals.

Also, according to another aspect of the present invention, the first or second fixed electrode is made of a single metallic material.

Consequently, even when the first and second fixed electrode is made of a single metallic material, it is possible to avoid the generation of hillocks on the surfaces of the fixed electrodes and to eliminate the occurrence of film peeling of the electrodes or the like. Therefore, the reliability can be enhanced. In addition, since an inexpensive material such as Al can be adopted for the first or second fixed electrode, it is possible to anticipate an improvement in manufacturing cost and yield as well as an improvement in fluctuation in thicknesses of the electrodes.

Since a plurality of grooves or holes are formed at fixed intervals in the first or second metallic electrode formed on the surface of the upper or lower substrate, even when the first or second fixed electrode is made of a single metallic material, it is possible to avoid the generation hillocks on the surface of the first or second fixed electrode. Consequently, it is possible to provide the highly reliable and inexpensive dynamic quantity sensor that prevents film peeling of the fixed electrodes.

DETAILED DESCRIPTION OF THE PREFERRED EMBODIMENTS

A preferred embodiment of the present invention will hereinafter be described in detail by giving as an example an angular velocity sensor typifying a capacitance type dynamic quantity sensor of the present invention with reference to the accompanying drawings.

Figure 1:
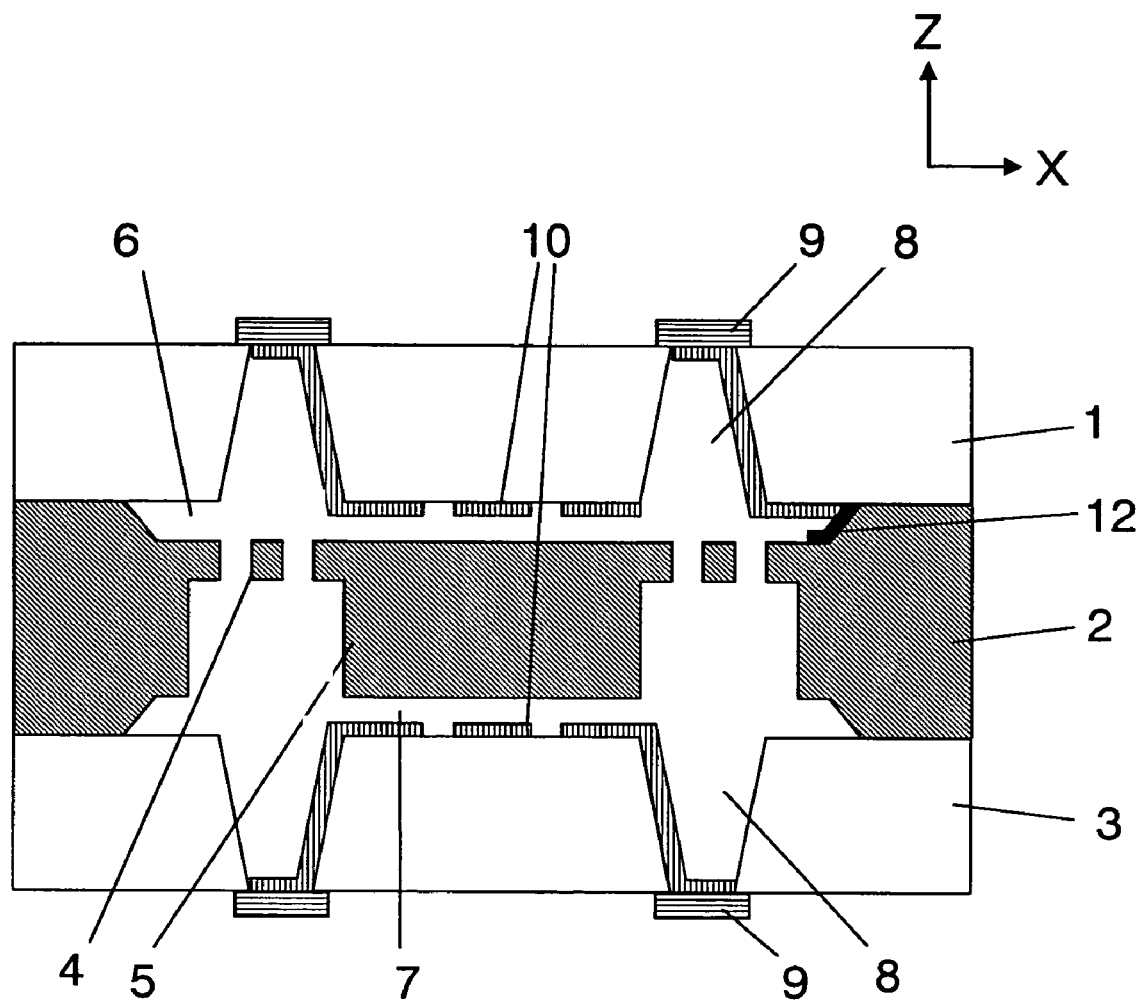
FIG. 1 is a schematic cross sectional view showing a capacitance type dynamic quantity sensor according to an embodiment of the present invention.

FIG. 1 shows a schematic cross sectional view of an angular velocity sensor according to an embodiment of the present invention. Referring to FIG. 1, this capacitance type dynamic quantity sensor has a three-layer structure including an upper glass substrate 1, (first substrate), a silicon substrate 2 (third substrate), and a lower glass substrate 3 (second substrate). These three substrate 1, 2 and 3 are joined to each other to form the three-layer structure. A vibration member having beams 4 and a weight 5 is formed within the silicon substrate 2 through the etching process. The vibration member is adapted to be vibrated or twisted due to an applied force from the outside (i.e., an external force). A shape of each beam 4 related to its thickness, length and width, and a shape of the weight 5 related to its thickness, area and the like are designed so as to obtain an arbitrary resonance frequency and an arbitrary spring constant. In addition, a minute gap 6 is defined between the upper side of the beams 4 and of the weight 5 of the silicon substrate 2, and a rear of the upper substrate 1 facing the upper side of the beams 4 and the weight 5. Also, a minute gap 7 is defined between a lower side of the beams 4 and of the weight 5 of the silicon substrate 2, and a rear of the lower glass substrate 3 facing the lower side of the beams 4 and the weight 5. Through holes 8 are formed in parts of the upper and lower glass substrates 1 and 3 between which the silicon substrate 2 having the vibration member formed therein is vertically sandwiched. Electrodes formed on inner sides of the upper and lower glass substrates 1 and 3 extend to the outside through those through hole 8. An electrically conductive material 9 is laminated on each of the outlets of the through holes 8, and hence the sealing for the internal space defined between the upper and lower glass substrates 1 and 3 is maintained. Fixed electrodes 10, 11 (first and second electrodes) which are formed on the inner surfaces of the upper and lower glass substrates 1 and 3, respectively, are drawn for the electrically conductive materials 9 to the outside through wirings which are formed on side walls of the through holes 8, respectively.

Figure 2:
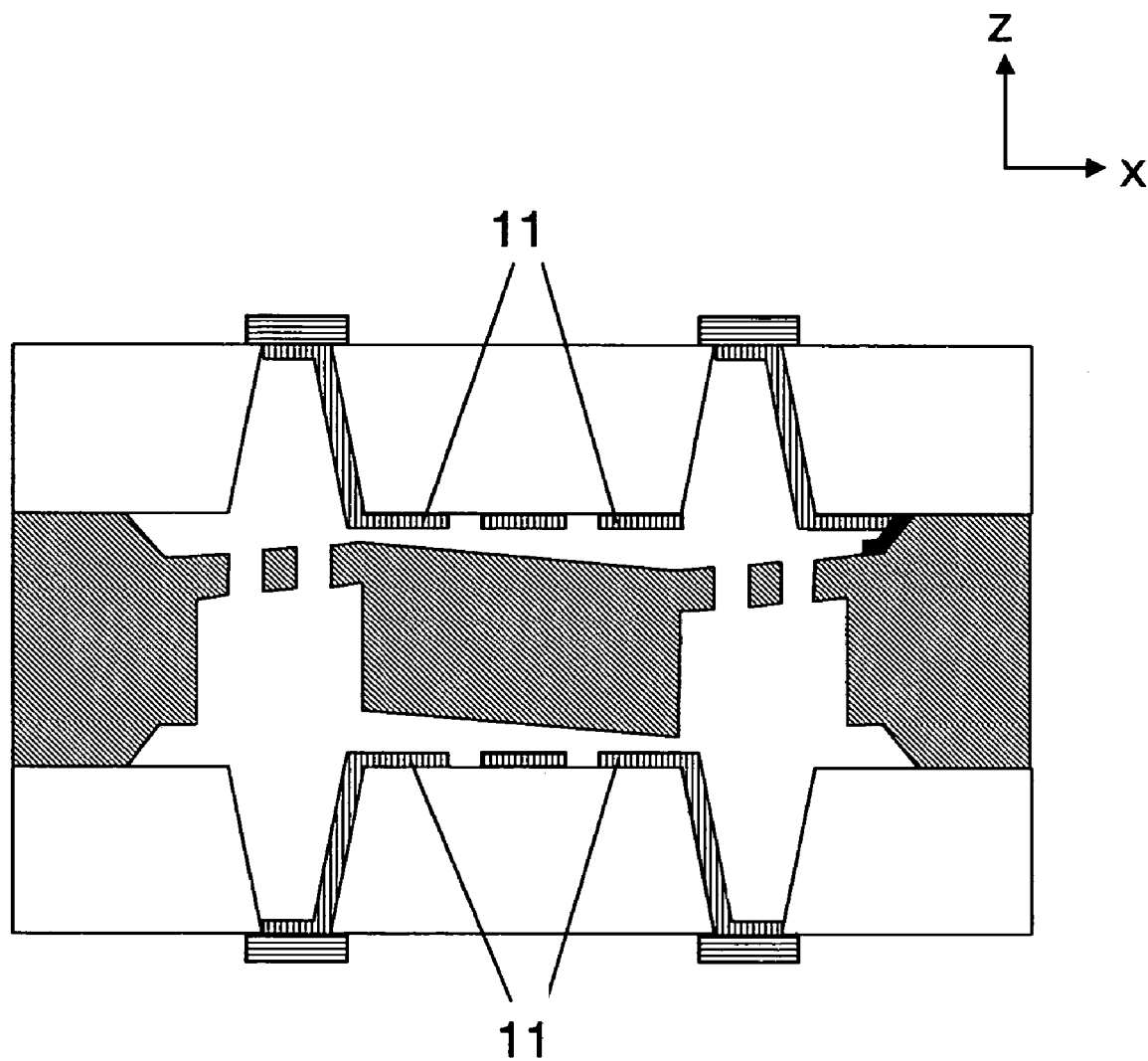
FIG. 2 is a schematic cross sectional view showing a state where beams are bent due to angular velocity applied from the outside in the capacitance type dynamic quantity sensor according to the embodiment of the present invention.

In this angular velocity sensor, it is necessary to control an electric potential of the silicon substrate 2. Thus, a part of the electrodes formed on the inner surfaces of the upper and lower glass substrates 1 and 3 is provided so as to contact a substrate electrode 12 formed on the silicon substrate 2 in order to ensure the electric potential of the silicon substrate 2. Here, the operation principle of this angular velocity sensor will hereinafter be described in brief. An A.C. voltage is applied across exciting fixed electrodes 10 which are formed on the inner surface sides of the upper and lower glass substrates 1 and 3, respectively, to vertically vibrate the weight by an electrostatic force acting between the exciting fixed electrodes 10 and the vibration member having the ground potential held thereat. If an angular velocity around the y-axis is applied to the vibration member to which a velocity is applied in the z-axis direction in such a manner, then a Coriolis force proportional to a product of the angular velocity and the velocity acts on the vibration member in the x-axis direction. As a result, the beams are bent a shown in FIG. 2. Detecting fixed electrodes 11 are provided on the inner surface sides of the upper and lower glass substrates 1 and 3, respectively. Thus, a change is generated in capacitance obtained between the detecting fixed electrodes 11 and the movable electrodes of the vibration member due to inclination of the weight resulting from the bending of the beams. Then, the magnitude of the angular velocity is detected based on the change in capacitance.

As described above, in the capacitance detection type angular velocity sensor, distances between the detecting fixed electrodes 11 and the movable electrodes are directly concerned in the magnitude of the capacitance. Hence, if there is a fluctuation in the distances, then the electrostatic force acting between the exciting fixed electrodes 10 and the movable electrodes changes, and thus the velocity of the vertical vibration, varies and also the capacitance obtained between the detecting fixed electrodes 11 and the movable electrodes also varies. This exerts a large influence on the detection sensitivity. In addition, if hillocks are generated on the exciting fixed electrodes 10 or on the detecting fixed electrodes 11, the detection sensitivity fluctuation due to the fluctuation in the minute gaps 6 and 7 is generated, and also the movable range for the beam is narrowed to cause the reduction of the sensitivity of the sensor. In general, use of gold or platinum in the electrodes can avoid the generation of the hillocks on the electrodes, and also resistance values of the electrodes can be set low. However, gold or platinum is an expensive material, and hence the manufacturing cost is increased. In addition, since those metallic materials are weak in adhesive force with a glass material, it is necessary to form a film for strengthening the adhesive force between such a metallic material and a glass material, requiring a multiplayer structure to be adopted. Since the multilayer structure becomes the cause of the film peeling, it is inferior in reliability.

Figure 3:
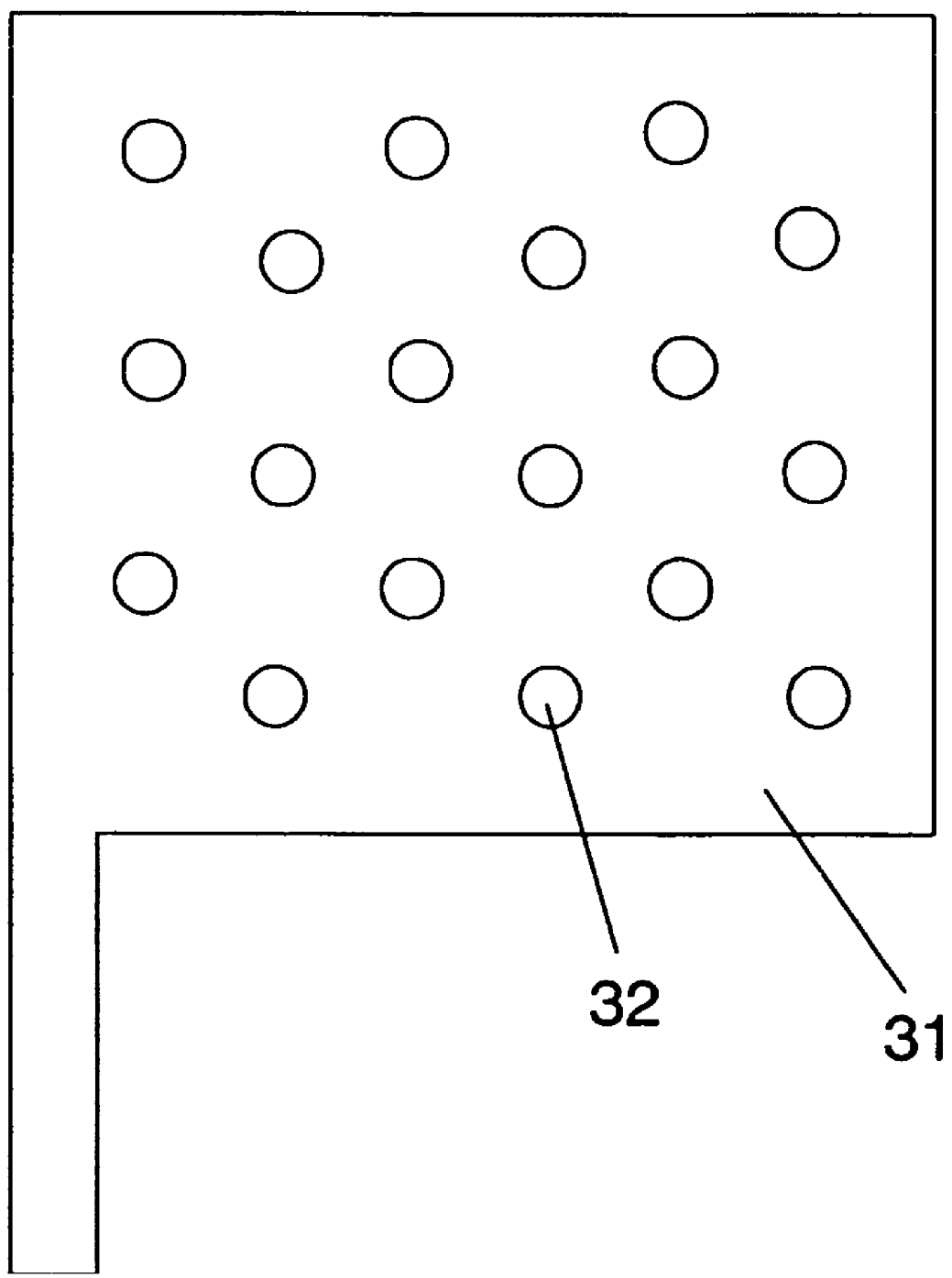
FIG. 3 is a plan view showing a structure of an electrode of the capacitance type dynamic quantity sensor according to the embodiment of the present invention.

FIG. 3 is a plan view explaining a structure of the fixed electrode (corresponding to the exciting fixed electrode 10 or the detecting fixed electrode 11) 31 of the angular velocity sensor according to the embodiment of the present invention. Circular holes 32 are regularly formed at equal intervals in a portion of the fixed electrode 31, the holes 32 being in the form of through-holes extending through opposite main surfaces of the fixed electrode. For example, in a case where the fixed electrode having no hole 32 is made of a material such as Al, atoms of which are easy to migrate at a low energy, the hillocks are easily generated on the surface of the fixed electrode through the heat process. However, in the case where the circular holes 32 as shown in FIG. 3 are formed in the fixed electrode, the energy of Al is dispersed in side face directions of the circular holes 32, and hence the hillocks are hardly generated on the surface of the fixed electrode. Intervals of the circular holes 32 can be arbitrarily set. Thus, adoption of the intervals between the holes 32 suitable for the process (especially, the heat process) can block the generation of the hillocks on the surface of the fixed electrode. It is to be understood that the shape of this hole 32 is not limited to a circle, and hence may also be polygon.

Figure 4:
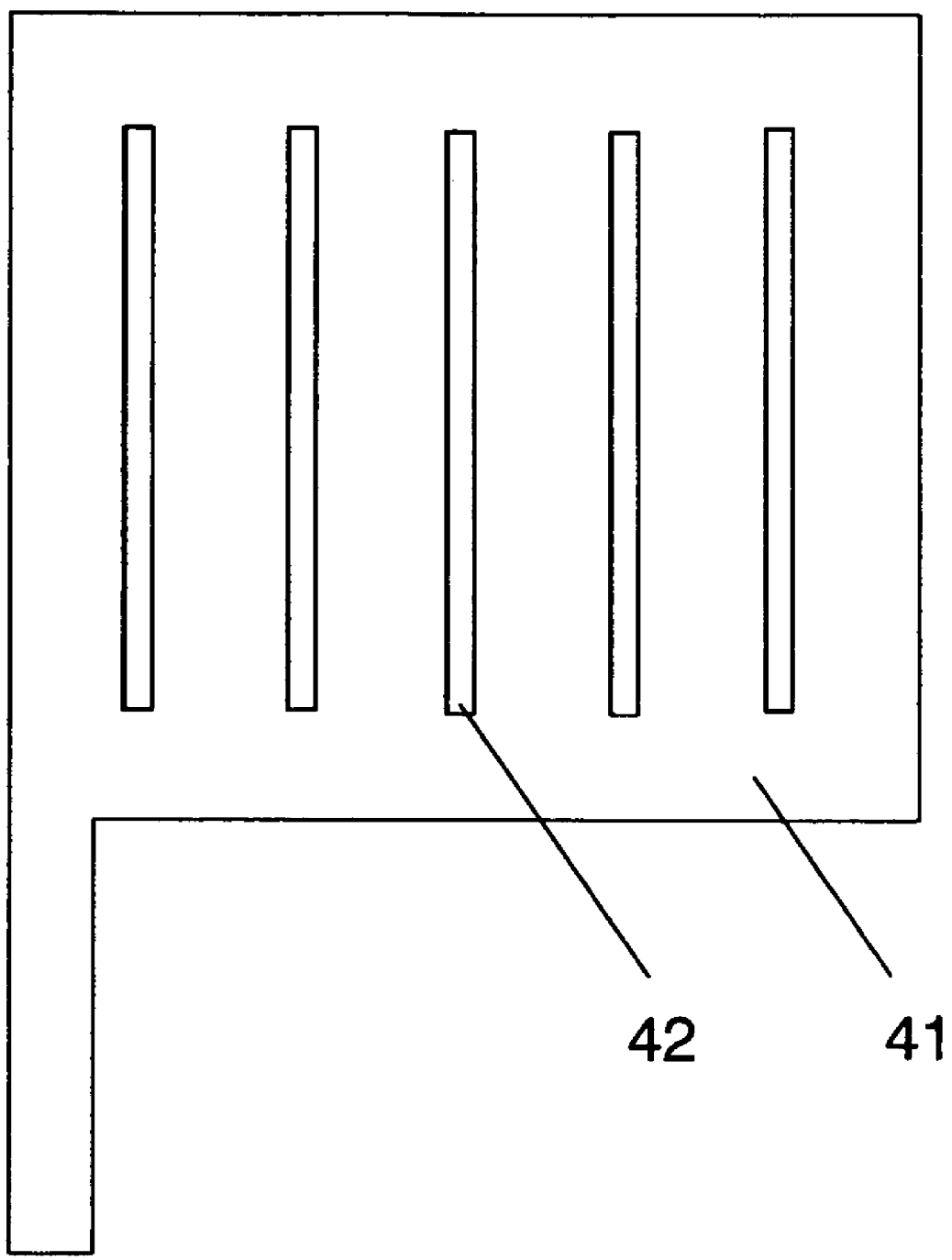
FIG. 4 is a plan view showing another structure of an electrode of the capacitance type dynamic quantity sensor according to the embodiment of the present invention.
Figure 5:
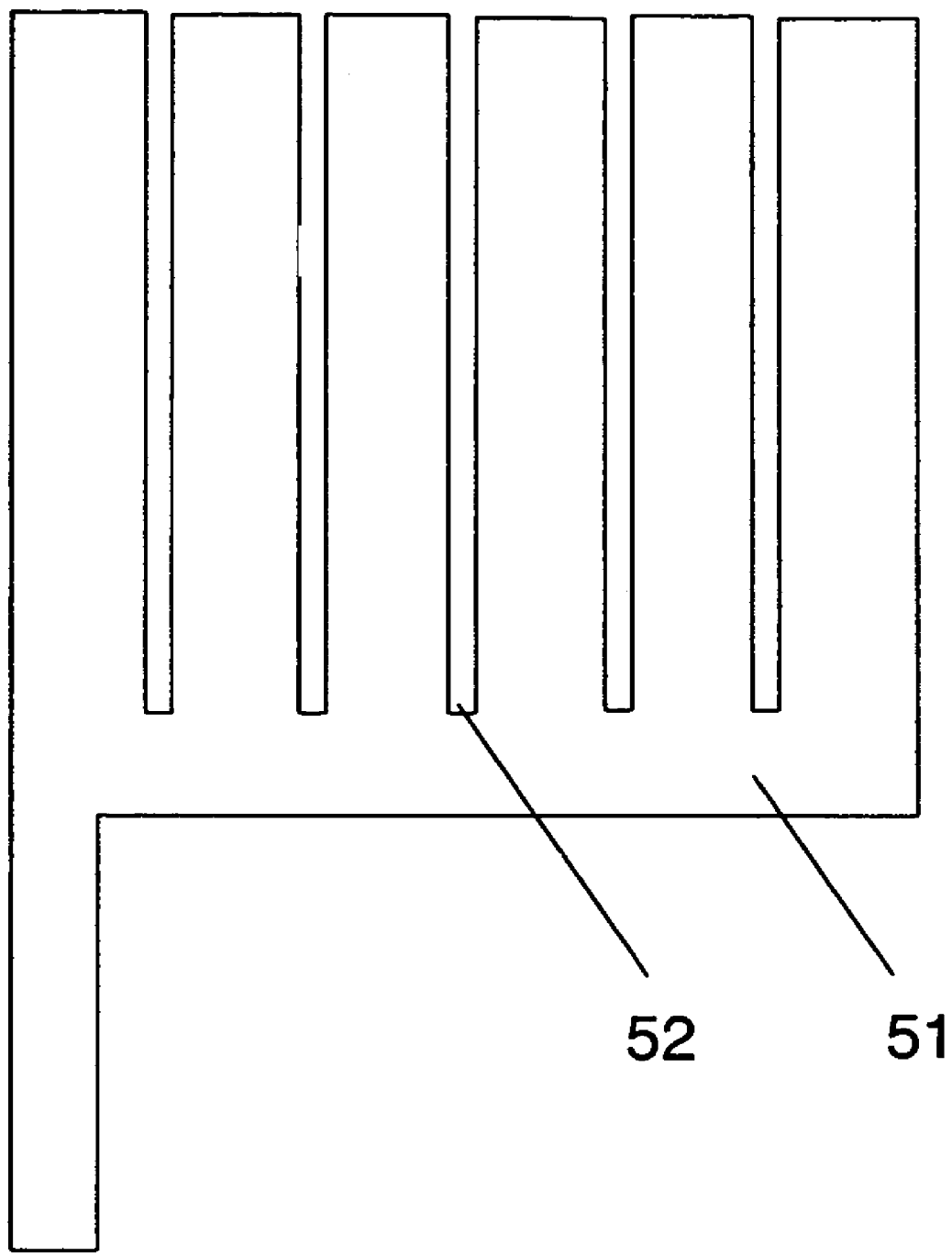
FIG. 5 is a plan view showing still another structure of an electrode of the capacitance type dynamic quantity sensor according to the embodiment of the present invention.
Figure 6:
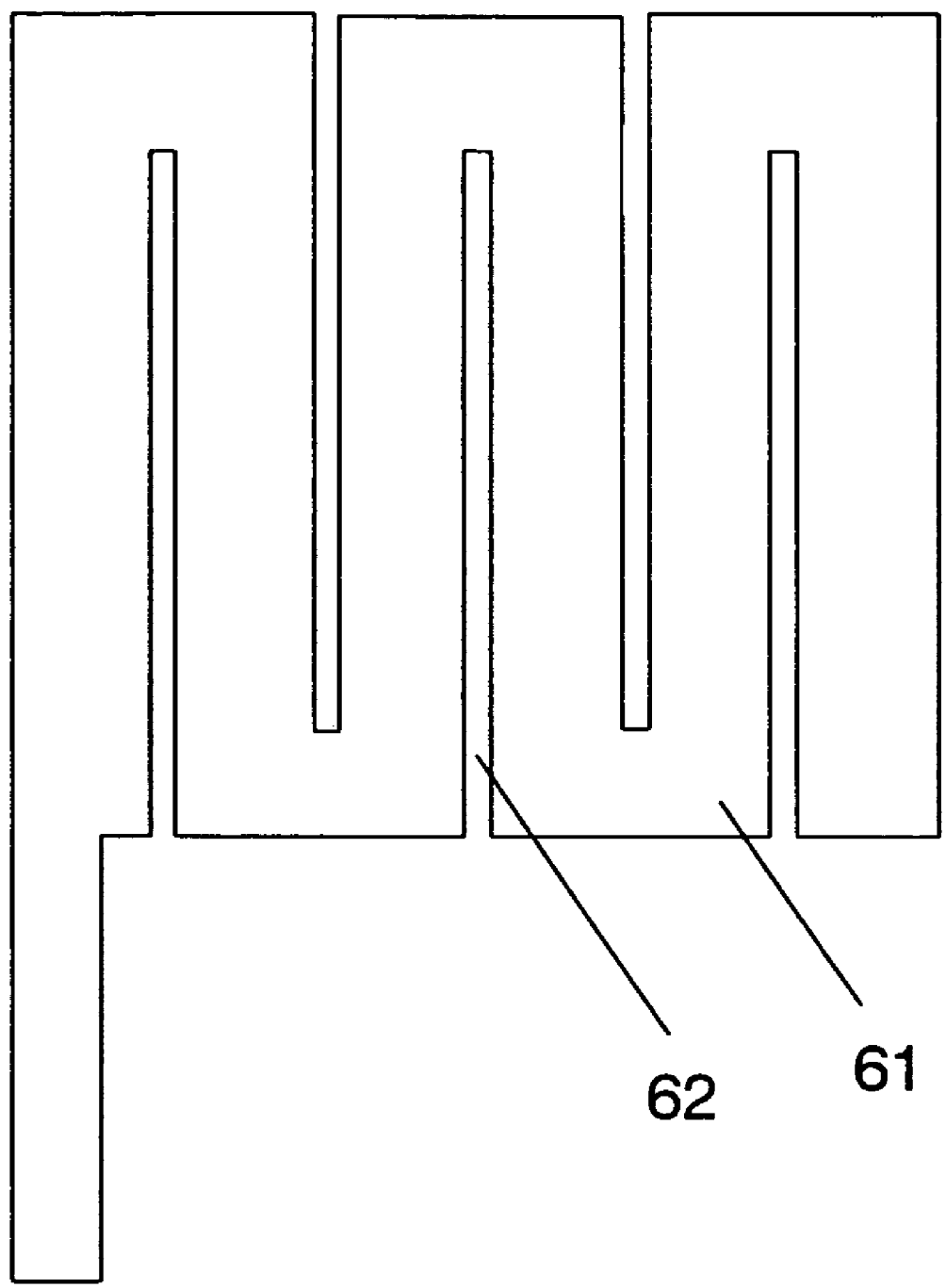
FIG. 6 is a plan view showing yet another structure of an electrode of the capacitance type dynamic quantity sensor according to the embodiment of the present invention.
Figure 7:
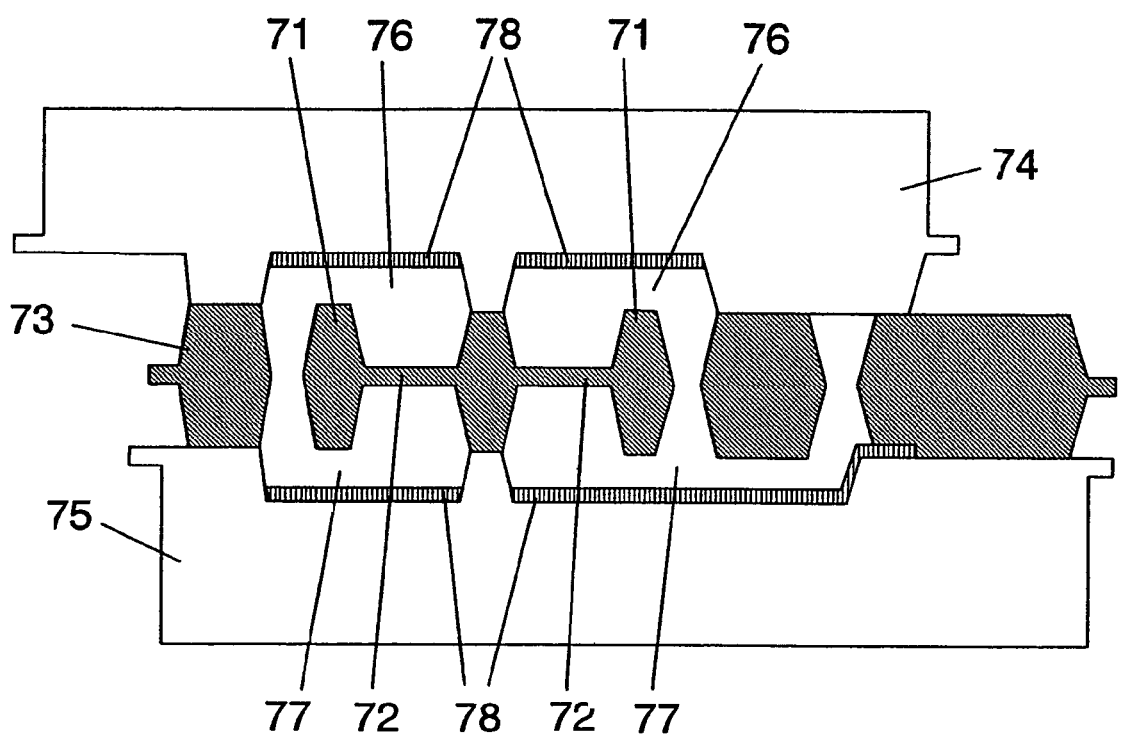
FIG. 7 is a schematic cross sectional view showing a conventional capacitance type dynamic quantity sensor.

In addition, as shown in the embodiment of FIG. 4, also when grooves 42, which are through-holes extending through the opposite main surfaces of the fixed electrodes, are formed at equal intervals in a fixed electrode 41, the same effect as that in the case of FIG. 3 can be obtained. A shape of the grooves 42 is not limited to a rectangle, and hence may also be a polygon or an ellipse. In addition, a direction of extension of a long side of the rectangle and a major axis of the ellipse is also not limited to that illustrated in the figure. In addition, as shown in the embodiments of FIGS. 5 and 6, it is also possible to adopt such a structure that one side of a groove or through-hole 52 agrees in position with the outer periphery of a fixed electrode 51 or 61. For example, in the embodiments of FIGS. 5 and 6, at least one of the grooves opens to one of opposite peripheral side surfaces of the portion of the fixed electrode. In other words, a structure may be adopted for the fixed electrode as long as an electrode continuously extends in terms of the electric potential. In FIG. 5. the fixed electrode has a comb-shaped structure. The structures of the fixed electrodes 31, 41, 51 and 61 can be readily formed similarly to the general semiconductor process by forming their patterns onto photo masks in formation of these fixed electrodes 31, 41, 51 and 61. In addition, since the fixed electrode can be made of metallic material, such as Al, which is inexpensive in material cost and which has a low resistance value, it is possible to cope with the cost reduction. Also, since the fixed electrode can be formed of a single film, the film peeling is hardly caused in the fixed electrode. As a result, it is possible to manufacture the sensor device which is excellent in reliability.

The foregoing examples are not limited to the angular velocity sensor, and hence are applicable for other types of capacitance change detection type dynamic quantity sensors, such as an acceleration sensor and a pressure sensor.

The capacitance type dynamic quantity sensor according to the present invention which is suitable for miniaturization and reducing manufacturing costs is expected to be mainly used in a portable/handy type apparatus, or in a function for monitoring movement in virtual reality or the like. For example, the capacitance type dynamic quantity sensor according to the present invention is effective as a sensor for detecting information of an inclination angle by utilizing gravity, or a sensor for correcting movement of the hands in a camera and the like. Consequently, the capacitance type dynamic quantity sensor according to the present invention may be widely utilized as consumer sensor devices due to its low manufacturing cost and the capability for miniaturization.

What is claimed is:

1. A capacitance type dynamic quantity sensor for detecting a physical dynamic quantity, the capacitance type dynamic quantity sensor comprising:
a semiconductor substrate having a weight supported by beams and mounted to undergo displacement due to an applied external dynamic quantity such as acceleration or angular velocity;
an upper substrate connected to a part of a first surface of the semiconductor substrate, the upper substrate having a first fixed electrode laminated thereon so as to confront the weight with a minute gap therebetween, the first fixed electrode having a plurality of through-holes extending between opposite main surfaces of the first fixed electrode; and
a lower substrate connected to a part of a second surface of the semiconductor substrate, the lower substrate having a second fixed electrode laminated thereon so as to confront the weight with a minute gap therebetween, the second fixed electrode having a plurality of through-holes extending between opposite main surfaces of the second fixed electrode;
wherein for each of the first and second fixed electrodes, the through-holes provide the respective first and second fixed electrodes with a comb-shaped structure for preventing the generation of hillocks on surfaces of the first and second fixed electrodes.

2. A capacitance type dynamic quantity sensor for detecting a physical dynamic quantity, the capacitance type dynamic quantity sensor comprising:
a semiconductor substrate having a weight supported by beams and mounted to undergo displacement due to an applied external dynamic quantity such as acceleration or angular velocity;
an upper substrate connected to a part of a first surface of the semiconductor substrate, the upper substrate having a first fixed electrode laminated thereon so as to confront the weight with a minute gap therebetween, the first fixed electrode having a plurality of through-holes extending between opposite main surfaces of the first fixed electrode; and
a lower substrate connected to a part of a second surface of the semiconductor substrate, the lower substrate having a second fixed electrode laminated thereon so as to confront the weight with a minute gap therebetween, the second fixed electrode having a plurality of through-holes extending between opposite main surfaces of the second fixed electrode;
wherein the through-holes of each of the first and second fixed electrodes prevent the generation of hillocks on surfaces of the first and second fixed electrodes.

3. A capacitance type dynamic quantity sensor according to claim 1; wherein at least one of the first fixed electrode and the second fixed electrode is made of a single metallic material.

4. A capacitance type dynamic quantity sensor comprising:
a first substrate;
a first electrode disposed on a main surface of the first substrate, the first electrode having a plurality of through-holes formed in a portion thereof and extending between opposite main surfaces of the first electrode;
a second substrate disposed over the first substrate;
a second electrode disposed on a main surface of the second substrate, the second electrode having a plurality of through-holes formed in a portion thereof and extending between opposite main surfaces of the second electrode;
a third substrate disposed between and connected to the main surface of each of the first and second substrates; and
a vibration member disposed on the third substrate so as to confront the first and second electrodes with gaps therebetween, the vibration member being mounted on the third substrate for undergoing vibrational movement in response to application of an acceleration or an angular velocity to the vibration member so that the capacitance type dynamic quantity sensor detects a dynamic quantity in accordance with a change in capacitance between the first and second electrodes due to vibrational movement of the vibration member;

wherein for each of the first and second electrodes, the through-holes provide the portion of the respective first and second electrodes with a comb-shaped structure for preventing the generation of hillocks on surfaces of the first and second electrodes.

5. A capacitance type dynamic quantity sensor according to claim 2; wherein adjacent ones of the plurality of through-holes of each of the first and second fixed electrodes are spaced apart from one another at equal intervals.

6. A capacitance type dynamic quantity sensor according to claim 2; wherein at least one of the first fixed electrode and the second fixed electrode is made of a single metallic material.

7. A capacitance type dynamic quantity sensor according to claim 2; wherein the through-holes of each of the first and second fixed electrodes are generally circular-shaped.

8. A capacitance type dynamic quantity sensor according to claim 2; wherein the through-holes of each of the first and second fixed electrodes are generally polygon-shaped.

9. A capacitance type dynamic quantity sensor according to claim 2; wherein the through-holes of each of the first and second fixed electrodes comprise generally rectangular-shaped grooves.

10. A capacitance type dynamic quantity sensor according to claim 2; wherein the through-holes of each of the first and second fixed electrodes comprise generally elliptical-shaped grooves.

11. A capacitance type dynamic quantity sensor according to claim 2; wherein the through-holes of each of the first and second fixed electrodes comprise grooves disposed generally parallel to one another.

12. A capacitance type dynamic quantity sensor according to claim 2; wherein each of the first and second fixed electrodes has a plurality of peripheral side surfaces; and wherein the through-holes of each of the first and second fixed electrodes comprise grooves each opening to one of the peripheral side surfaces of the respective first and second fixed electrodes.

* * * * *